UNITED STATES PATENT OFFICE.

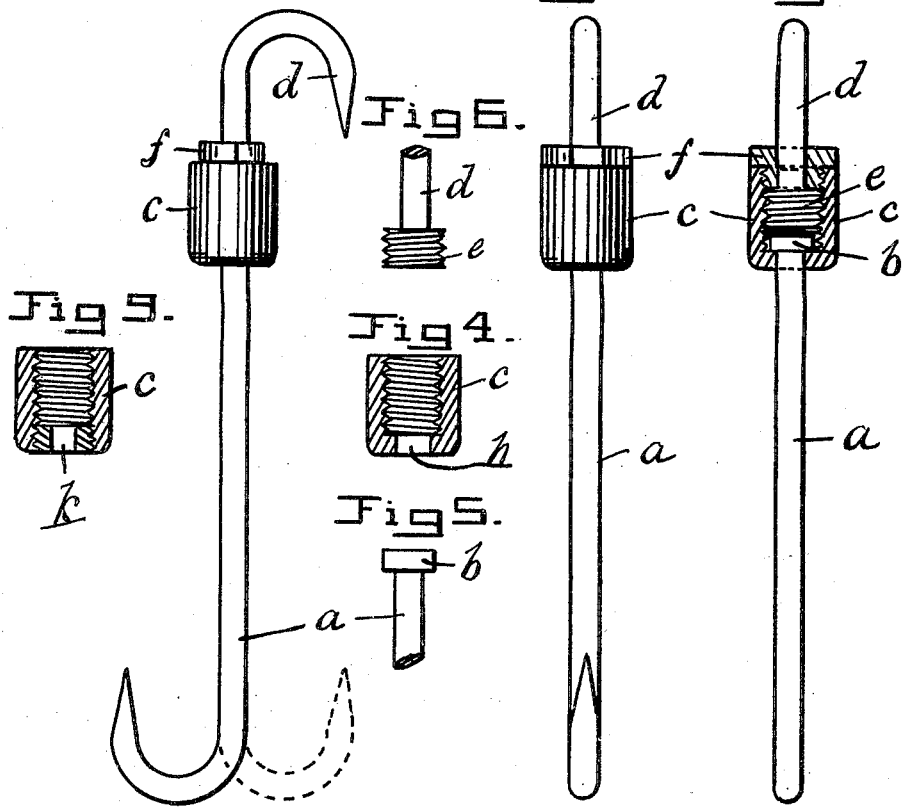
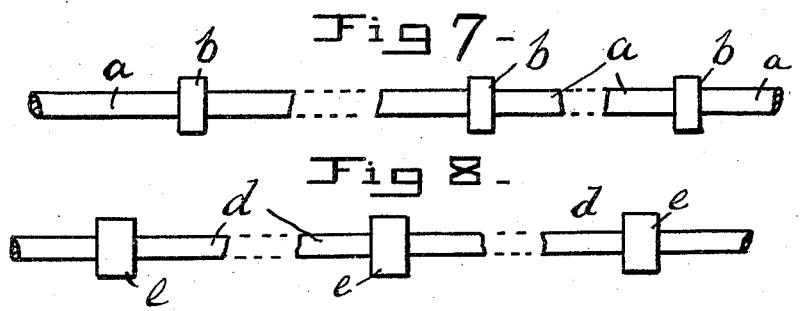

JOSEPH TAIT, OF BIRMINGHAM, ENGLAND.

MANUFACTURE OF SWIVEL OR UNIVERSAL HOOKS.

1,404,807. Specification of Letters Patent. Patented Jan. 31, 1922.

Application filed March 10, 1920. Serial No. 364,871.

(GRANTED UNDER THE PROVISIONS OF THE ACT OF MARCH 3, 1921, 41 STAT. L., 1313.)

*To all whom it may concern:*

Be it known that JOSEPH TAIT, subject of King George V of Great Britain, residing at No. 143 Icknield Port Road, Birmingham, England, has invented certain new and useful Improvements in the Manufacture of Swivel or Universal Hooks, (for which I have filed an application in England, December 18, 1918, Patent Number 130,876,) of which the following is a specification.

This invention relates to the improvements hereinafter described in the manufacture of swivel or universal hooks, and has reference principally to butchers' hooks, in which two hooks, a short and long one, are connected together by a swivel, the object of which is to enable the bottom hook to turn in any direction on the shorter one.

In the arrangements hitherto existing, a headed pin consisting of a ball or cheese head, is permitted to turn in any direction, such arrangements being made either by casting around the said heads to form the socket part, or by forming a ball to fit a metal cup by turning the metal over the ball. Other similar devices have also been adopted.

These arrangements have many disadvantages, such as cost of production, the joint not giving reliable results in casting, and the turning over of the metal rendering them unserviceable.

In the arrangement forming the object of this invention, I dispense with the casting or the turning of metal over the ball on the headed shank.

A distinguished feature of my said invention is that I make the device from solid drawn rods or tubes in the following manner:—

I provide an ordinary butcher's hook, that is to say, the bottom hook, having a cheese or semi-spherical head. I make a tubular socket to fit over the said head which rests, and is capable of turning in any direction on a flange formed on the lower end of the socket, the upper part of which is screwed internally. Into the said screwed part of the socket I fit a screw shank, which is integral with the upper hook. This said screwed shank takes bearing on the head of the lower hook sufficiently to enable its turning in any direction, and to admit of adjustment. I may in some cases furnish the said screw shank with a set pin or lock nut.

This said shank and upper hook is made from ordinary solid drawn tubing or rod.

I may in some cases make the screw socket and shank and upper hook from specially shaped tubing or rod, sawn off in lengths.

In order that my invention may be more readily understood reference is made in the following particular description to the accompanying drawings, throughout which like letters of reference indicate corresponding parts, and in which—

Figures 1 and 2 are side elevations of a butcher's hook made in accordance with my invention.

Figure 3 is a vertical section of the same hook.

Figures 4, 5 and 6 are detail parts.

Figures 7 and 8 are modifications of my invention.

Fig. 9 is a sectional view of a somewhat modified form of socket.

*a* represents a long hook provided with the cheese head *b*, adapted to fit loosely into the tubular screwed socket *c*; *d* is the short hook provided with the screwed shank, *e*; *f* is a lock nut.

The lower or large hook *a* is made from a length of solid drawn rod. The cheese head *b* may be screwed thereon, or may be attached by electric or other weldings as shown in Figures 3 and 5, or I may make this said hook by rolling or drawing in length such as shown at Figure 7, and sawing off to the required length. The lower hook *a* is capable of turning on the head *b*, in any direction as shown at Figure 1. The shorter hook *d*, is made from a length of solid drawn rod, with the shank *e* shown at Figure 6, in the same manner as that aforesaid, in connection with the long hook *a*, or I may make them from rolled or drawn rod as shown at Figure 8, and sawn off to the required lengths.

This said shank *e* is screwed to fit the socket *c*, so as to enable the head *b* to turn freely within the socket *c*, the lock nut *f* keeping the parts in their place.

The screw socket *c* Figures 4 and 9, is made from solid drawn tubing. The flange *h* is made by pressing inward a portion of the metal, or I may make this said flange by inserting a screw plug $k$, such as shown in Figure 9. It is obvious that the parts of the said joint may be detached for cleansing purposes.

I claim:—

In a meat hook, the combination with an internally threaded tubular socket having one end open and the opposite end provided with an inturned perforated flange, an upwardly directed hook having an elongated shank, said shank having an enlarged head freely movable in the perforation in the flange and resting on the flange within the socket, a second downwardly directed hook having a shorter shank, said shank having a portion thereof enlarged and threaded designed to engage the threads on the inner face of the socket, and a lock nut having a central orifice through which the shank of the second hook member extends, said lock nut having a threaded shank within the open end of the socket and engaging the threads of the latter.

JOSEPH TAIT.

Witnesses:
SIDNEY F. WRIGHT,
FLORENCE M. BARACLOUGH.